United States Patent [19]
Schumacher, II et al.

[11] Patent Number: 5,077,961
[45] Date of Patent: Jan. 7, 1992

[54] CUTTER BLADE FOR MOWERS OF HARVESTING MACHINES AND A METHOD FOR THE PRODUCTION THEREOF

[76] Inventors: Gustav Schumacher, II, Gartenstrabe 8; Günter Schumacher, Raiffeisenstrasse 10, both of D - 5231 Eichelhardt, Fed. Rep. of Germany

[21] Appl. No.: 535,883

[22] Filed: Jun. 11, 1990

[30] Foreign Application Priority Data

Jun. 19, 1989 [DE] Fed. Rep. of Germany ....... 3919933
Jun. 19, 1989 [DE] Fed. Rep. of Germany ....... 3919934

[51] Int. Cl.$^5$ .......................................... A01D 34/82
[52] U.S. Cl. ..................................... 56/255; 56/295; 56/DIG. 2; 56/DIG. 17; 72/340
[58] Field of Search ................. 56/255, 295, 298, 300, 56/17.5, DIG. 2, DIG. 17, DIG. 20; 29/889.7, 557; 72/340, 412, 379.2

[56] References Cited

U.S. PATENT DOCUMENTS

| | | |
|---|---|---|
| 513,834 | 1/1894 | Smith . |
| 552,665 | 1/1896 | Miller . |
| 2,497,400 | 2/1950 | Eller ........................... 72/340 |
| 3,096,608 | 7/1963 | Williamson ................... 56/295 |
| 3,712,037 | 1/1973 | Knipe ........................... 56/296 |
| 4,628,672 | 12/1986 | Jones ........................... 56/295 |

FOREIGN PATENT DOCUMENTS

| | | |
|---|---|---|
| 2126944 | 2/1971 | Fed. Rep. of Germany . |
| 3208270 | 3/1982 | Fed. Rep. of Germany . |
| 10893 | 6/1895 | United Kingdom . |

*Primary Examiner*—Terry L. Melius
*Attorney, Agent, or Firm*—W. Thad Adams, III

[57] ABSTRACT

The invention relates to a cutter blade for mowers of harvesting machines the cutter bevel of which comprises two zones of different inclination relative to the blade leaf plane wherein between the zone molded to the cutting edge and the zone extending to the upper blade plane a gradation is provided. It relates furtheron to a method for the production of said cutter bevels on cutting blades of mowers which comprise two zones having different blade angles relative to the blade leaf plane wherein in a first embossing process the zone of the cutter bevel extending to the upper blade plane is pressed into the blade blank in parallel to the cutting edge provided and in a subsequent embossing process, the zone extending to the cutting edge is molded on and the embosssing portion extending beyond the lower blade leaf plane is ground away.

6 Claims, 2 Drawing Sheets

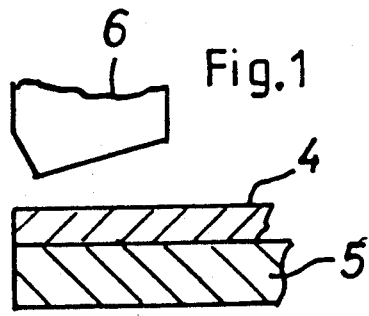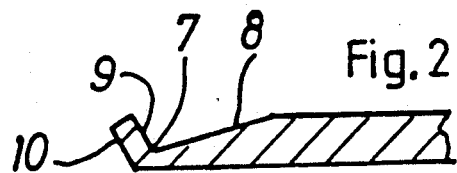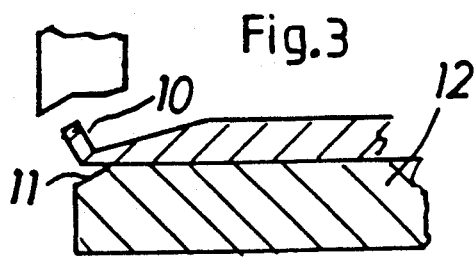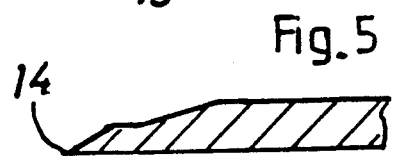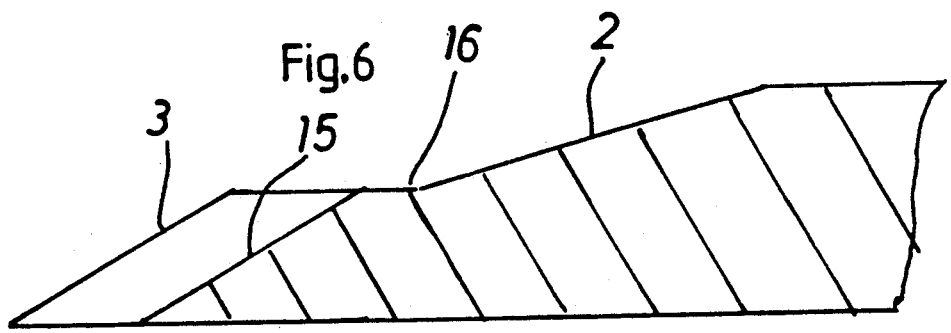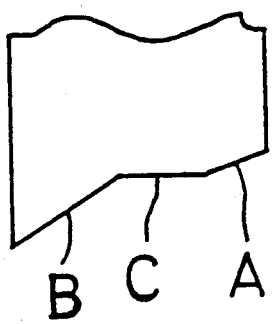

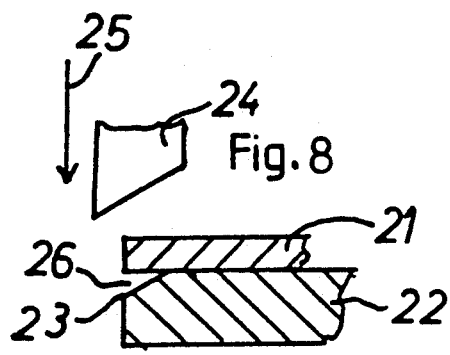
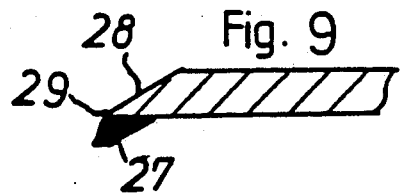
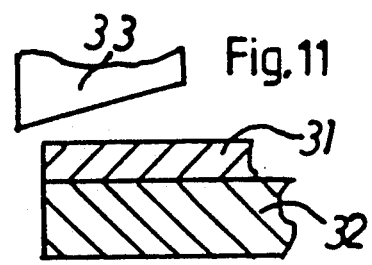
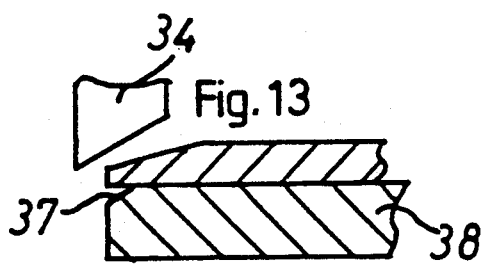
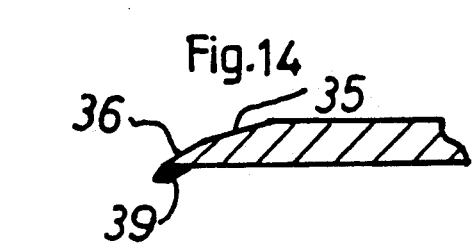
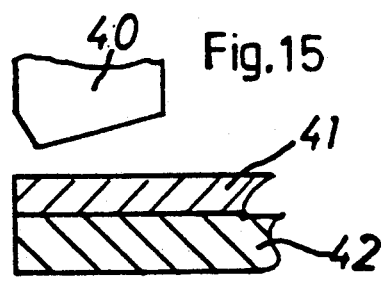
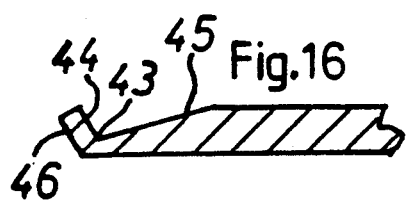
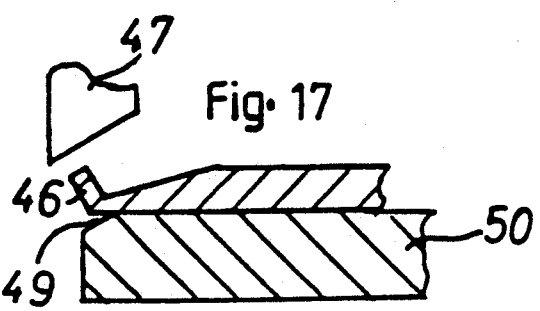
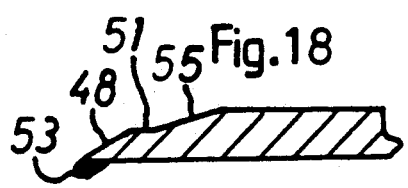
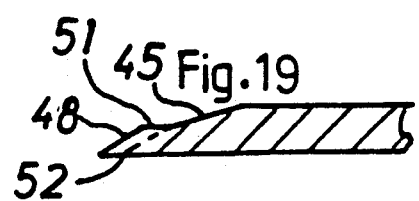

CUTTER BLADE FOR MOWERS OF HARVESTING MACHINES AND A METHOD FOR THE PRODUCTION THEREOF

The invention relates to a new cutter blade for mowers of harvesting machines as well as to a method for the production of the cutter bevels on cutter blades of mowers, particularly of reaping cutter blades for harvesting machines.

Such blades are employed for to and fro going reaping cutters in an approximately basic triangular shape having cutter bevels unilaterally sharpened and extending at an angle relative to one another in almost all stalk material harvesting machines. In rotational mowers furtheron blades of rectangular basic shape including cutter bevels extending in parallel relative to each other are employed as well. In the case of the last-mentioned blades, only one cutter each of the blade is in use, depending on the direction of rotation of the rotor.

Since the invention relates to the shaping of cutter blades, it is suited for almost all mower blades particularly for the blades of oscillatingly operating reaping cutters. In the following description, reference is made for simplicity sake to such blades only.

The cutters of such cutter blades interact with the reaping fingers provided on the cutter bar which reaping fingers function as counter knives and, as a rule, possess a finger lip disposed above the proper counter cutter, which finger lip supports the cutting material against the cutter blade to prevent the stalks from falling flat before being cut. However, the danger still exists that individual stalks squeeze between the counter cutter and the cutter blade and lift the latter from the counter cutter.

In order to apply only little force for the cutting process when using very broad mowers comprising a plurality of cutter blades, it has been tried to employ thin blades. This however has the disadvantage that in case of strong loads the blades are bent and lifted from the counter cutter.

Thicker blades on the other hand have the disadvantage that stalks cut by the relatively steep cutter bevel are drawn under the finger lip and are there squeezed in. Such squeezing-in strains the reaping cutters quite considerably since the forces required per blade sum up with the number of blades employed.

If on the other hand, the cutter bevel of the cutter blade is chosen so flat that the cut material is easily pushed by the finger lip over it, then on the other hand the cutting edge is so thin that, under the rough working conditions in the field, it will easily break. Particularly in case of the nowadays frequently used toothed blades, the very thin tooth tips break away thus decreasing the cutting efficiency quite considerably.

In case of such toothed blades, which are blades wherein the cutter bevel includes indentations, the danger that stalks are drawn under the finger lip, is particularly great. For reasons of production techniques, it has hitherto been difficult to provide the toothing only at the cutting edge of the cutter blade and to keep the remaining cutter bevel free from indentations.

The indentations provided on the cutter bevel and the scoring hence formed thereon normally cause a particular squeezing of the stalks under the finger lip. A more flatly shaped scored cutter bevel however in addition to the above-referenced danger of the breaking away of the thin tooth tips, is for reasons of production techniques extremely difficult to make.

A further disadvantage of the so-called "top toothed" blades is seen in that if the pressed-in, or cut-in, tooth indentations extend to the upper face of the blade, the danger of cracking for the blades suitably hardened up to the maximum possibility occurs. It is a further disadvantage that in case of a very coarse tooth pitch which is suitably employed particularly in grain and soy bean mowers, sand grains from always the same direction are guided from the indentations over the cutter blade and together with the fine dust enlarge the indentations over the whole blade leaf.

This does not only entail an additional danger of cracking, the cut harvested material is also prevented from flowing rearwardly. It has shown that in case of sandy soils these through-going indentations will occur in less than 100 operating hours already.

In German Offenlegungsschrift No. 2,126,944, a blade has been described which by deformation of the whole blade leaf receives a gradation directed to the cutter bevel. This deformation serves for automatic sharpening of the blade and has the disadvantage that the blade calculated from the proper cutting plane has approximately twice the material thickness. It is therefore suited for mowing systems only wherein the blade is not guided in a blade gap since otherwise the cut material will be drawn into the blade gap to a larger extent as is the case in case of common flat blades.

It is the same disadvantage which the blade according to U.S. Pat. No. 552,665 shows. This blade, too, is gradedly deformed in the blade leaf. A further disadvantage such blades have is that the lower side of the blade includes a circularly closed cavity in which in case of various harvested materials the juice of the cut stalks mixes with the soil, sticks fast and makes the reaping cutter so heavy that it might be blocked.

In U.S. Pat. No. 513,834 from 1894, a blade has been described which includes indentations on the lower side. Such blades are nowadays very seldom used and are replaced by the "top toothed" blades. The ground section of this blade described has been made hollow edged which should serve for easier regrinding. A blade described in British Patent Specification No. 10,893 from 1895 is identical in principle. In this case, too, the ground section is made hollow-edged in order to effect easier regrinding.

This kind of hollow-edge grinding however was not successful considering that it functionally included the decisive disadvantage that the cut harvested material in the concave ground portion is prevented from flowing off and also mixes with the soil, sticks fast in the hollow groove and disturbes the cutting process quite decisively.

In Applicant's own German Patent Application No. P 32 08 270.3-23, a blade has been described the ground portion of which is subdivided in two areas having different grinding angles, or is convex-shaped.

The cutting edge is made steeper in order to obtain stable teeth in the "top toothed" blades, and the subsequent ground area is made much flatter in order to avoid the disadvantages referred to. In practice, it has shown that blades having such a ground portion are more stable in the toothing, that cut harvested material is drawn to a much less extent into the blade gap and thus flows much more easily to the rear, that the blades are much easier operable since the ground portion shows the characteristics of a very flat ground portion, and that the danger of cracking in "top toothed" blades is quite decisively reduced because the indentations for the toothing are not made over the whole thickness of the blade.

The disadvantage of this blade is seen in that, first, a complicated ground portion of the cutter bevel is necessary since it has to be made either before or after pressing-in of the toothed indentations and secondly as is the case in the blades described as having disadvantages, there is the danger of cracking caused by the grinding grooves.

A further disadvantage stems from production technology. The bevel of the ground portion has to be applied by a grinding process, i.e. either before or after the pressing-in of the tooth indentations or the provision of two differently ground bevels. Grinding operations however are relatively expensive, and the removal of the considerable amounts of grinding dust which in case of dry grinding is hazardous to the health and hence has to be filtered away by complicated filter devices and in case of wet grinding is considered as special waste, is very cost-intensive.

It is now the aim of the invention to provide a new cutter blade for mowers of harvesting machines the cutter bevel of which comprises two zones of different inclination relative to the blade leaf plane wherein the aforementioned disadvantages are avoided and which, in addition, includes further advantages.

This problem is solved, in accordance with the invention, in that in the cutter blade defined above, the individual zones are non-cuttingly moldingly pressed-in, and between the zone molded to the cutting edge and the zone extending to the upper blade plane, a gradation is provided.

This gradation is preferably in parallel relative to the cutting edge, and with relation to the blade plane, the gradation may include any angle relative to the blade plane, preferably however the gradation plane is in parallel relative to the blade plane.

The zone at the cutting edge suitably includes a different, preferably steeper, angle relative to the blade plane than the zone extending from the gradation to the upper blade plane.

In case of "top toothed" blades, tooth indentations are suitably embossed only into the zone leading to the cutting edge. Since the tools for embossing tooth indentations are sensitive, this means a substantial reduction of tool wear. Furthermore, less pressing force is necessary.

Because of the gradation, the grinding process for the cutter bevel can be dispensed with. The two zones are embossed in two embossing steps instead. An additional embossing process is substantially cheaper than a grinding process. Grinding processes are moreover dangerous both for the operator and the environment because the filter dust has to be filtered away and grinding slime has to be disposed of.

A quite decisive advantage however is the higher stability of the blade. This results from the effect that cracks in the cutting edge which are caused again and again by foreign bodies, are interrupted in the stage between the lower and the upper cutter bevel zone because the tooth indentation taper off in this stage.

Since by the grinding no material is carried away from the cutter bevel, the basic body of the blade may be smaller for a few millimeters. When embossing, the blade regains the required width. In this way, material is saved, too.

With a view to the reduced danger of cracking, the blade may more strongly be hardened. This again increases the life time of the blade. A stability of a few degrees higher relative to common blades may lead to a multiplication of the life time of the blades.

Particularly in case of "top toothed" blades, the harvested material flows substantially easier onto the upper blade plane since the stalk flowing through the tooth indentations, and decelerated therein, become free in the intermediate stage and easily flow off via the subsequent smooth zone.

In summary, the cutter blade according to the invention offers the following advantages:

1. Less base material is used;
2. Less grinding work is necessary;
3. The danger of cracking is reduced;
4. Hardening at higher temperature is possible and hence
5. The life time of the blades is substantially improved;
6. Less embossing pressure is required for the application of the tooth indentations so that the wear of the tools is reduced;
7. Smoothly-cutting blades can be produced in the embossing process;
8. Smooth cutting blades can more easily be reground; and
9. As compared to common blades, the cut material flows off substantially easier.

By the gradation according to the invention it has for the first time become possible to also produce non-toothed cutter bevels in an embossing process. Hitherto this has been possible only by grinding the bevels. Contrary to "top toothed" blades, wherein the material of the cutter bevel in the embossing process can flowingly distribute from the indentations in the tooth ribs (depending on the toothing, the surface of the cutter bevel in case of "top toothed" blades is more than double the amount as compared to smooth tooth bevels), in case of the embossing of a cutting bevel, on which the indentations are missing, the material can flow only to the outside. No one succeeded so far to mold a functionally sufficient flat cutting bevel by a single embossing process. By providing a gradation in the cutting bevel by repeated embossing, this is very simple as will be described in the following.

Regrinding of smooth blades is furthermore also much simpler since only the zone molded to the cutting edge has to be reground. The zone of the cutter bevel rearwards of the cutting zone is not ground. The blade therefore retains in this zone the extreme stability obtained by material compaction in the embossing process.

A further aim of the invention is the provision of a new method for the production of the cutter bevels on cutter blades of mowers, which comprise two zones having different blade angles relative to the blade leaf plane and which preferably correspond to the cutter blades according to Applicant's own Patent Application No. P 32 08 279.3-23 wherein the grinding operations are substantially reduced.

This problem is solved by a method of the kind defined in the foregoing which is characterized in that in a first embossing process, the zone of the cutter bevel extending to the upper blade plane is pressed into the blade blank in parallel to the cutting edge provided, and in a subsequent embossing process, the zone extending to the cutting edge is molded on and the embossing portion extending beyond the lower blade leaf plane is then ground away.

By such a method, the grinding work is quite substantially reduced, and in addition substantially less raw material is required for the blank. The method according to the invention is therefore substantially more economic and above all more friendly towards the environment because substantially less grinding dust is produced which, as has already been mentioned in the foregoing, produces problems with a view to the disposal thereof.

In accordance with a preferred embodiment of the method of the invention, in a first embossing process, a wedge-shaped groove in parallel to the cutting edge provided is pressed into the blank, one groove flank of which groove forming the zone extending along the upper blade plane and then, in a second embossing process, the free rib of the wedge-shaped groove is molded to form the cutter bevel zone.

By such an embodiment of the method according to the invention, the material deformed in the embossing process has the possibility to evade to the side and thus to form the rib which than in the second embossing process is deformed to constitute the cutter bevel zone. For grinding works, there remains only the embossing portion extending beyond the lower blade leaf plane, which in the two-stage embossing processes described in the foregoing can be kept relatively small by selecting the dimensions correspondingly so that no substantial grinding operations become necessary and hence no substantial amount of grinding dust will be produced.

In accordance with a further advantageous embodiment of the present invention, indentations are pressed simultaneously withthe shape forming embossing process, or a further embossing process, into the zone directed towards the cutting edge.

It has shown to be of particular advantage if in the method according to the invention the zone of the cutter bevel directed to the cutting edge is molded having a steeper angle relative to the blade plan than the zone molded in the first embossing process. A so-formed cutter bevel on cutter blades proves to be particularly advantageous in practical operation, and in addition has such an embodiment also particular advantages if indentations are provided in the zone directed towards the cutting edge.

In accordance with a particularly preferred embodiment of the method according to the invention, a gradation approximately parallel relative to the blade plane is molded by corresponding development of the embossing piston between the two cutter bevel zones extending in parallel relative to each other.

In practical operation, such an embodiment shows particular advantages which will be explained in detail in the following.

The invention will now be described in more detail based on the attached drawings.

Since the invention relates only to the formation of the cutter bevel on cutter blades, it is only this cutter bevel which is shown in cross section rather than the complete blade.

In the drawings,

FIG. 1 shows the embossing arrangement for performing the first embossing process for the production of a cutter blade according to the invention.

FIG. 2 shows a cross section through the cutter bevel obtained in the first embossing process.

FIG. 3 shows the embossing arrangement for performing the second embossing process.

FIG. 4 shows a cross section through the cutter bevel obtained in the second embossing process.

FIG. 5 shows a cross section through the finished cutter bevel of a cutter blade according to the invention.

FIG. 6 shows an enlarged representation of the cross section of the "top toothed" cutter bevel according to the invention.

FIG. 7 shows an enlarged representation of the embossing piston for the second embossing process.

FIG. 8 shows an embossing arrangement in a common embossing process.

FIG. 9 shows a blade blank as obtained after a common embossing process.

FIG. 10 shows a finished blank as obtained after a common embossing process.

FIG. 11 showns the embossing arrangement according to the embossing process of the invention.

FIG. 12 shows a blade blank after the first embossing process according FIG. 11.

FIG. 13 shows the embossing arrangement according to the second embossing process of the invention.

FIG. 14 shows a blade blank after the second embossing process according to FIG. 13.

FIG. 15 shows a particularly advantageous embossing arrangement for the first embossing process of the invention.

FIG. 16 shows a blade blank after the first embossing process according to FIG. 15.

FIG. 17 shows an embossing arrangement for the second embossing process of the blade blank according to FIG. 16.

FIG. 18 shows a blade blank as obtained after the second embossing process according to FIG. 17.

FIG. 19 shows a finished cutter bevel of a cutter blade obtained after the embossing process according to FIGS. 15 and 17 and the necessary finishing grinding.

In order to obtain the gradation 1 between zone 2 and zone 3 of the cutter bevel it is suitable to mold the two zones including the gradation in consecutive embossing processes.

During the first embossing process, blade blank 4 is placed on flat anvil 5. Embossing piston 6 presses groove 7 including flanks 8 and 9 into the blank. By so doing, material flows to the outside and the cross section according to FIG. 2 is obtained. Flank 8 has already the desired angle relative to the blade plane, which angle corresponds to zone 2. Towards the cutting edge desired, rib 10 has formed.

In a second embossing process according to FIG. 3, rib 10 is now pressed to form zone 3 graded relative to zone 2. Thereby, some material flows into the free space 11 of die 12 whereby rib 13 is formed. It is only this rib 13 which has lateron to be ground away in order to obtain a sharp cutting edge 14. Zones 2 and 3 of the cutter bevels may have the same angle relative to the blade plane, but may have different angles as well; the angle of zone 3 is preferably steeper than the angle of zone 2 relative to the blade plane. Gradation 1 is formed preferably in parallel relative to the blade plane. As can be taken from the enlarged representation of the embossing piston according to FIG. 7, area A corresponds to zone 2 and area B to zone 3 of the cutter bevel while by means of area C gradation 1 is formed.

In case of so-called "top toothed" blades, the tooth indentations are pressed into zone 3 only. This can either be done simultaneously with the second embossing process according to FIG. 3, or in a subsequent embossing process. With "top toothed" blades, it is also suitable if zone 3 has a steeper angle relative to the blade plane than zone 2. The tooth tips become more stable.

As to the function, a cutter bevel so shaped has also substantial advantages.

In case of smooth blades, regrinding is much simpler because, as already mentioned, it is only zone 3 which has to be reground. The cut material glides much easier over the upper blade plane and is not drawn under the finger lips of the reaping fingers.

In "top toothed" blades, the indentations taper off already in gradation 1. Cutting material which, as is natural, is cut between the toothing, that is in the indentations tapering off towards the cutting edge, will flow from indentations 15 into the free space of the cutter bevel formed by the gradation and can flow over the flat zone 2 onto the upper blade plane without any hindrance as is the case with common blades by the indentations drawn over the whole blade level.

The stability of a cutter blade is substantially increased by the cutter bevel graded as in accordance with the invention. Since zone 2 is free from grinding scratches in case of smooth blades and above this free from indentations in case of "top toothed" blades, transverse cracks of blades which also start with a smal fracture in a grinding scratch or an indentation are avoided.

It is however not only the contour of the gradation 1 which offers additional stability, the material compacting in zone 2 caused by the embossing also adds to the stability increase.

By the cutter bevel according to the invention, finally, the life time of the blade is, indirectly, increased too, because, as has already been mentioned, it can be hardened to a higher value because of the decreased danger of cracking.

The production process according to the invention will now be explained based on FIGS. 8 through 19.

Since the basic shape of the blade is immaterial for the description of the process—according to the present method, cutting edges of all possible blade shapes may be made—the representation of the figures is restricted to the cross sections of the blades in the area of the cutter bevels.

In accordance with the common embossing process, blade blank 21 is placed on a die 22 which includes, along the blade cutter to be formed, beveled edge 23. Embossing piston 24 is pressed in the direction of arrow 25 onto the blade blank. Thereby material is pressed to the outside and downwardly into the free space 26 of die 22. The embossing piston may be smooth on its embossing side, for the production of top toothed blades however it has indentations on the embossing side constituting the negative to the blade toothing. The toothing is not shown on the drawings since it is immaterial for the explanation of the process.

After the embossing process, the cutter of the blade, as seen in cross section in FIG. 9, has been shaped. Rib 27 has pressed itself, along the whole cutting edge under the lower plane of the blade blank, into the free space 26 and has to be ground away after the embossing process or after the hardening of the blades.

The prior art embossing process described effects the relatively steep formation of the cutting bevel 28. Would a piston 24 be used having a more flat embossing angle, the free space 26 in the die had to be selected correspondingly larger when embossing the "top toothed" blades in order to be able to press the indentations in cutting bevel 28 sufficiently deep so that after grinding away rib 27, the toothing in cutting edge 29 is reached as well.

For such a flat embossing, substantially higher embossing pressures have to be applied. A further disadvantage is that a very flat cutting bevel 28 also leads to a very thin and hence instable cutting edge 29.

In order to combine, nevertheless, the advantages of the flat cutting bevel with the advantages of a stable cutting edge, area 30 of the cutting bevel according to FIG. 10 is ground off as in accordance with Applicant's own patent application No. P 32 08 270.3-23. This leads to the disadvantages of this process referred to in the beginning.

It has now shown that the desired profile of the cutting bevel can be obtained by two different embossing processes.

In the first embossing process, blade 31 is disposed on flat anvil 32. Embossing piston 33 has a very flat embossing bevel. By means of this flat embossing bevel, the blade blank receives a first embossed pressing which forms the cross section of the cutting bevel as shown in FIG. 12.

In the second embossing process according to FIG. 13, the embossing piston 34 has a much steeper embossing bevel than the piston in the first embossing process and molds zone 36 which is much steeper relative to the blade plane. By so doing, material is pressed into the free space 37 of die 38 and lower rib 39 is formed, which however includes much less material than rib 27 according to FIG. 9 obtained according to the common process. By multi-step embossing, therefore, much less grinding work becomes necessary than would be the case in the prior art method.

It has shown that in accordance with a further embodiment of the method according to the invention a further advantage is obtained in that in the first embossing process, embossing piston 40 includes a wedge-shaped embossing contour (FIG. 15).

In that case, blade blank 41 is also disposed on flat anvil 42 and during the embossing process blade material is pressed from one embossing flank to the outside. In the blade blank along the cutter bevel provided, groove 43 comprising the two flanks 44 and 45 is formed. Flank 45 will already obtain the desired flat angle relative to the blade plane.

By the wedge-shaped embossing, outsidely inclined rib 46 has formed. In the second embossing process, embossing piston 47 presses, by means of its steeper embossing bevel, rib 46 to form the steeper cutter bevel zone 48. By selecting the pressing force and the dimension of the cutout in die 50, zone 48 after the embossing processes either changes directly into the more-flat zone 45 or between zones 48 and 45 gradation 51 occurs.

It has shown that the gradation between zones 48 and 45 has various quite decisive advantages, particularly in case of the "top toothed" cutter bevels. The indentations which are necessary for the production of "top toothed" blades taper off before they reach zone 45. The blade leaf remains substantially more stable, cut stalks glide much easier to the upper blade plane, and sand or soil particles can easier glide out from the indentations. In the second embossing process, for the final embossing of the cuting edge, rib 53 may be much smaller and there is less grinding work.

While according to the process according to Applicant's own Patent Application No. P 32 08 270.3-23 the areas 27 and 30 shown in FIGS. 9 and 10 have to be carried away by grinding, in the process of the present invention this is the case with rib 39, or 53, respectively, only. The costs of a second embossing process furthermore amount to only a fraction of those of a grinding process and are almost completely absorbed by the smaller consumption of material, which depending on the shape of the blade and the thickness of the blade amounts to between 4 and 6%. In a double too or follow-on tool, wherein both embossings can be made by one stroke, there will be no costs at all for the additional embossing process.

We claim:

1. A method for the production of cutter bevels on mower cutter blades having a blade leaf plane defined by upper and lower blade leaf planes, said blades having first and second bevel portions having the same or different blade angles relative to the blade leaf planes; and comprising the steps of:

(a) in a first embossing step, pressing a first bevel portion of the cutter bevel into a blade blank from which the blade is formed, said first bevel portion extending to an upper blade plane of the cutter blade; and (b) in a second embossing step, molding a second bevel portion onto the blade blank extending to a cutting edge of said blank; and (c) grinding away the part of the second bevel portion extending beyond the lower blade leaf plane.

2. A method according to claim 1, wherein the first embossing step includes the step of pressing a wedge-shaped groove parallel to the cutting edge into the blade blank, a groove flank of said groove forming the first bevel portion, and the second embossing step includes the step of molding a rib onto said wedge-shaped groove, said rib being shaped to the second bevel portion of said blade.

3. A method according to claim 1, wherein indented portions of reduced thickness are formed in the direction of the cutting edge in the second bevel portion of the blade blank simultaneously with the embossing process.

4. A method according to claim 1, wherein indented portions of reduced thickness are formed in the second bevel portion of the blade blank in a following separate process.

5. A method according to claim 1, wherein said second bevel portion has a steeper angle relative to the lower blade plane than said first bevel portion.

6. A method according to claim 1, wherein a third bevel portion is formed between said first and second bevels, said third bevel being approximately parallel to the lower blade plane.

* * * * *